US007636486B2

(12) United States Patent
Steinberg et al.

(10) Patent No.: US 7,636,486 B2
(45) Date of Patent: *Dec. 22, 2009

(54) METHOD OF DETERMINING PSF USING MULTIPLE INSTANCES OF A NOMINALLY SIMILAR SCENE

(75) Inventors: Eran Steinberg, San Francisco, CA (US); Peter Corcoran, Co. Galway (IE); Yury Prilutsky, San Mateo, CA (US)

(73) Assignee: FotoNation Ireland Ltd., Galway (IE)

( * ) Notice: Subject to any disclaimer, the term of this patent is extended or adjusted under 35 U.S.C. 154(b) by 670 days.

This patent is subject to a terminal disclaimer.

(21) Appl. No.: 10/985,657

(22) Filed: Nov. 10, 2004

(65) Prior Publication Data

US 2006/0098890 A1    May 11, 2006

(51) Int. Cl.
*G06K 9/40* (2006.01)
*G06K 9/00* (2006.01)
*G06K 9/32* (2006.01)
*H04N 5/228* (2006.01)

(52) U.S. Cl. .................. 382/255; 382/107; 382/294; 382/299; 348/208.99

(58) Field of Classification Search .............. 382/107; 348/208.99, 208.1, 208.4, 208.14, 208.16
See application file for complete search history.

(56) References Cited

U.S. PATENT DOCUMENTS

| 5,251,019 A | 10/1993 | Moorman et al. |
| 5,374,956 A | 12/1994 | D'Luna |

(Continued)

FOREIGN PATENT DOCUMENTS

DE    3729324 A1    3/1989

(Continued)

OTHER PUBLICATIONS

Dufournaud et. al., "Matching Images With Different Resolutions", 2000 IEEE Conference Proceedings on Computer Vision and Pattern Recognition, IEEE.*

(Continued)

*Primary Examiner*—Bhavesh M Mehta
*Assistant Examiner*—Nathan Bloom
(74) *Attorney, Agent, or Firm*—Andrew V. Smith (57) ABSTRACT

A digital image acquisition system includes a portable apparatus for capturing digital images and a digital processing component for detecting, analyzing and informing the photographer regarding motion blur, and for reducing camera motion blur in an image captured by the apparatus. The digital processing component operates by comparing the image with at least one other image, for example a preview image, of nominally the same scene taken outside the exposure period of the main image. In one embodiment the digital processing component identifies at least one feature in a single preview image which is relatively less blurred than the corresponding feature in the main image, calculates a point spread function (PSF) in respect of such feature, and de-convolves the main image using the PSF. In another embodiment, the digital processing component calculates a trajectory of at least one feature in a plurality of preview images, extrapolates such feature on to the main image, calculates a PSF in respect of the feature, and de-convolves the main image using the PSF. In another embodiment the digital processing unit after determining the degree of blur notifies the photographer of the existing blur or automatically invokes consecutive captures.

55 Claims, 8 Drawing Sheets

U.S. PATENT DOCUMENTS

| | | | |
|---|---|---|---|
| 5,392,088 A | 2/1995 | Abe et al. | |
| 5,428,723 A | 6/1995 | Ainscow et al. | |
| 5,510,215 A | 4/1996 | Prince et al. | |
| 5,599,766 A | 2/1997 | Boroson et al. | |
| 5,686,383 A | 11/1997 | Long et al. | |
| 5,747,199 A | 5/1998 | Roberts et al. | |
| 5,751,836 A | 5/1998 | Wildes et al. | |
| 5,756,239 A | 5/1998 | Wake | |
| 5,756,240 A | 5/1998 | Roberts et al. | |
| 5,802,220 A | 9/1998 | Black et al. | |
| 5,889,277 A | 3/1999 | Hawkins et al. | |
| 5,889,554 A | 3/1999 | Mutze | |
| 5,909,242 A | 6/1999 | Kobayashi et al. | |
| 5,981,112 A | 11/1999 | Roberts | |
| 6,028,960 A | 2/2000 | Graf et al. | |
| 6,035,072 A | 3/2000 | Read | |
| 6,061,462 A | 5/2000 | Tostevin et al. | |
| 6,081,606 A | 6/2000 | Hansen et al. | |
| 6,114,075 A | 9/2000 | Long et al. | |
| 6,124,864 A | 9/2000 | Madden et al. | |
| 6,134,339 A | 10/2000 | Luo | |
| 6,269,175 B1 | 7/2001 | Hanna et al. | |
| 6,297,071 B1 | 10/2001 | Wake | |
| 6,297,846 B1 | 10/2001 | Edanami | |
| 6,326,108 B2 | 12/2001 | Simons | |
| 6,330,029 B1 | 12/2001 | Hamilton et al. | |
| 6,360,003 B1 | 3/2002 | Doi et al. | |
| 6,365,304 B2 | 4/2002 | Simons | |
| 6,387,577 B2 | 5/2002 | Simons | |
| 6,407,777 B1 | 6/2002 | DeLuca | |
| 6,535,244 B1 | 3/2003 | Lee et al. | |
| 6,555,278 B1 | 4/2003 | Loveridge et al. | |
| 6,567,536 B2 | 5/2003 | McNitt et al. | |
| 6,599,668 B2 | 7/2003 | Chari et al. | |
| 6,602,656 B1 | 8/2003 | Shore et al. | |
| 6,607,873 B2 | 8/2003 | Chari et al. | |
| 6,618,491 B1 | 9/2003 | Abe | |
| 6,625,396 B2 | 9/2003 | Sato | |
| 6,643,387 B1 | 11/2003 | Sethuraman et al. | |
| 6,863,368 B2 | 3/2005 | Sadasivan et al. | |
| 6,892,029 B2 | 5/2005 | Tsuchida et al. | |
| 6,947,609 B2 | 9/2005 | Seeger et al. | |
| 6,961,518 B2 | 11/2005 | Suzuki | |
| 7,019,331 B2 | 3/2006 | Winters et al. | |
| 7,072,525 B1 | 7/2006 | Covell | |
| 7,084,037 B2 | 8/2006 | Gamo et al. | |
| 7,160,573 B2 | 1/2007 | Sadasivan et al. | |
| 7,180,238 B2 | 2/2007 | Winters | |
| 7,195,848 B2 | 3/2007 | Roberts | |
| 7,269,292 B2 | 9/2007 | Steinberg | |
| 7,315,630 B2 | 1/2008 | Steinberg et al. | |
| 7,315,631 B1 | 1/2008 | Corcoran et al. | |
| 7,316,630 B2 | 1/2008 | Tsukada et al. | |
| 7,316,631 B2 | 1/2008 | Tsunekawa | |
| 7,317,815 B2 | 1/2008 | Steinberg et al. | |
| 7,336,821 B2 | 2/2008 | Ciuc et al. | |
| 7,369,712 B2 | 5/2008 | Steinberg et al. | |
| 7,403,643 B2 | 7/2008 | Ianculescu et al. | |
| 7,453,510 B2 | 11/2008 | Kolehmainen et al. | |
| 7,460,695 B2 | 12/2008 | Steinberg | |
| 7,469,071 B2 | 12/2008 | Drimbarean et al. | |
| 7,551,755 B1 | 6/2009 | Steinberg et al. | |
| 7,565,030 B2 | 7/2009 | Steinberg et al. | |
| 2001/0036307 A1* | 11/2001 | Hanna et al. ............... 382/154 | |
| 2002/0006163 A1 | 1/2002 | Hibi et al. | |
| 2003/0052991 A1 | 3/2003 | Stavely et al. | |
| 2003/0058361 A1 | 3/2003 | Yang | |
| 2003/0091225 A1 | 5/2003 | Chen | |
| 2003/0103076 A1 | 6/2003 | Neuman | |
| 2003/0151674 A1 | 8/2003 | Lin | |
| 2003/0152271 A1 | 8/2003 | Tsujino et al. | |
| 2003/0169818 A1 | 9/2003 | Obrador | |
| 2003/0193699 A1 | 10/2003 | Tay | |
| 2003/0219172 A1 | 11/2003 | Caviedes et al. | |
| 2004/0066981 A1 | 4/2004 | Li et al. | |
| 2004/0076335 A1 | 4/2004 | Kim | |
| 2004/0090532 A1 | 5/2004 | Imada | |
| 2004/0120598 A1 | 6/2004 | Feng | |
| 2004/0120698 A1 | 6/2004 | Hunter | |
| 2004/0145659 A1* | 7/2004 | Someya et al. ......... 348/207.99 | |
| 2004/0169767 A1 | 9/2004 | Norita et al. | |
| 2004/0212699 A1* | 10/2004 | Molgaard ............... 348/231.99 | |
| 2004/0218057 A1 | 11/2004 | Yost et al. | |
| 2004/0218067 A1 | 11/2004 | Chen et al. | |
| 2005/0010108 A1 | 1/2005 | Rahn et al. | |
| 2005/0019000 A1 | 1/2005 | Lim et al. | |
| 2005/0031224 A1 | 2/2005 | Prilutsky et al. | |
| 2005/0041121 A1 | 2/2005 | Steinberg et al. | |
| 2005/0041123 A1 | 2/2005 | Ansari et al. | |
| 2005/0047672 A1 | 3/2005 | Ben-Ezra et al. | |
| 2005/0052553 A1 | 3/2005 | Kido et al. | |
| 2005/0057687 A1 | 3/2005 | Irani et al. | |
| 2005/0068446 A1 | 3/2005 | Steinberg et al. | |
| 2005/0068452 A1 | 3/2005 | Steinberg et al. | |
| 2005/0140801 A1 | 6/2005 | Prilutsky et al. | |
| 2005/0201637 A1 | 9/2005 | Schuler et al. | |
| 2005/0219391 A1 | 10/2005 | Sun et al. | |
| 2005/0231625 A1* | 10/2005 | Parulski et al. ......... 348/333.12 | |
| 2005/0259864 A1 | 11/2005 | Dickinson et al. | |
| 2005/0270381 A1* | 12/2005 | Owens et al. ............ 348/222.1 | |
| 2006/0006309 A1 | 1/2006 | Dimsdale et al. | |
| 2006/0017837 A1 | 1/2006 | Sorek et al. | |
| 2006/0038891 A1 | 2/2006 | Okutomi et al. | |
| 2006/0039690 A1 | 2/2006 | Steinberg et al. | |
| 2006/0093212 A1 | 5/2006 | Steinberg et al. | |
| 2006/0098237 A1 | 5/2006 | Steinberg et al. | |
| 2006/0098890 A1 | 5/2006 | Steinberg et al. | |
| 2006/0098891 A1 | 5/2006 | Steinberg et al. | |
| 2006/0120599 A1 | 6/2006 | Steinberg et al. | |
| 2006/0125938 A1* | 6/2006 | Ben-Ezra et al. ............ 348/241 | |
| 2006/0140455 A1 | 6/2006 | Costache et al. | |
| 2006/0170786 A1 | 8/2006 | Won | |
| 2006/0171464 A1 | 8/2006 | Ha | |
| 2006/0187308 A1 | 8/2006 | Lim et al. | |
| 2006/0204034 A1 | 9/2006 | Steinberg et al. | |
| 2006/0204054 A1 | 9/2006 | Steinberg et al. | |
| 2006/0204110 A1 | 9/2006 | Steinberg et al. | |
| 2006/0285754 A1 | 12/2006 | Steinberg et al. | |
| 2007/0025714 A1 | 2/2007 | Shiraki | |
| 2007/0058073 A1 | 3/2007 | Steinberg et al. | |
| 2007/0110305 A1 | 5/2007 | Corcoran et al. | |
| 2007/0147820 A1 | 6/2007 | Steinberg et al. | |
| 2007/0189748 A1 | 8/2007 | Drimbarean et al. | |
| 2007/0201724 A1 | 8/2007 | Steinberg et al. | |
| 2007/0269108 A1 | 11/2007 | Steinberg et al. | |
| 2007/0296833 A1 | 12/2007 | Corcoran et al. | |
| 2008/0037827 A1 | 2/2008 | Corcoran et al. | |
| 2008/0037839 A1 | 2/2008 | Corcoran et al. | |
| 2008/0037840 A1 | 2/2008 | Steinberg et al. | |
| 2008/0043121 A1 | 2/2008 | Prilutsky et al. | |
| 2008/0175481 A1 | 7/2008 | Petrescu et al. | |
| 2008/0219581 A1 | 9/2008 | Albu et al. | |
| 2008/0220750 A1 | 9/2008 | Steinberg et al. | |
| 2008/0231713 A1 | 9/2008 | Florea et al. | |
| 2008/0232711 A1 | 9/2008 | Prilutsky et al. | |
| 2008/0240555 A1 | 10/2008 | Nanu et al. | |
| 2008/0292193 A1 | 11/2008 | Bigioi et al. | |
| 2008/0309769 A1 | 12/2008 | Albu et al. | |
| 2008/0309770 A1 | 12/2008 | Florea et al. | |
| 2009/0003652 A1 | 1/2009 | Steinberg et al. | |
| 2009/0080713 A1 | 3/2009 | Bigioi et al. | |
| 2009/0080796 A1 | 3/2009 | Capata et al. | |
| 2009/0080797 A1 | 3/2009 | Nanu et al. | |
| 2009/0179999 A1 | 7/2009 | Albu et al. | |

| | | | |
|---|---|---|---|
| 2009/0185753 | A1 | 7/2009 | Albu et al. |
| 2009/0190803 | A1 | 7/2009 | Neghina et al. |
| 2009/0196466 | A1 | 8/2009 | Capata et al. |

FOREIGN PATENT DOCUMENTS

| | | |
|---|---|---|
| DE | 10154203 A1 | 6/2002 |
| DE | 10107004 A1 | 9/2002 |
| EP | 0 944 251 A | 9/1999 |
| EP | 1583033 A2 | 10/2005 |
| EP | 1779322 B1 | 1/2008 |
| EP | 1429290 B1 | 7/2008 |
| JP | 10285542 A2 | 10/1998 |
| JP | 11327024 A | 11/1999 |
| JP | 2008-520117 T | 6/2008 |
| WO | WO 98-43436 A | 10/1998 |
| WO | WO-0245003 A1 | 6/2002 |
| WO | WO-03071484 A1 | 8/2003 |
| WO | WO 2004/001667 A2 | 12/2003 |
| WO | WO-2004036378 A2 | 4/2004 |
| WO | 2006050782 A1 | 5/2006 |
| WO | WO-2007093199 A2 | 8/2007 |
| WO | WO-2007093199 A3 | 8/2007 |
| WO | WO-2007142621 A1 | 12/2007 |
| WO | WO-2007143415 A2 | 12/2007 |
| WO | WO-2008017343 A1 | 2/2008 |
| WO | WO-2008131438 A2 | 10/2008 |
| WO | WO-2009036793 A1 | 3/2009 |

OTHER PUBLICATIONS

Rahgozar et. al., "Motion Estimation Based on Time-Sequentially Sampled Imagery", IEEE Transactions on Image Processing, Jan. 1995, IEEE.*
Trussell H J et al., "Identification and restoration of spatially variant motion blurs in sequential images" IEEE Transactions on Image Processing USA, vol. 1, No. 1, Jan. 1992, pp. 123-126, XP002375828 ISSN: 1057-7149.
Rav-Acha A et al., "Restoration of multiple images with motion blur in different directions" Proceedings Fifth IEEE Workshop on Applications on Computer Vision IEEE Comput. Soc Los Alamitos, CA USA, 2000, pp. 22-28, XP002375829 ISBN: 0-7695-0813-8.
Ben-Ezra M et al., "Motion-Based Motion Deblurring", IEEE Transactions on Pattern Analysis and Machine Intelligence, IEEE Service Center, Los Alamitos, CA, US, vol. 26, No. 6, Jun. 2004, pp. 689-698, XP001211158, ISSN: 0162-8828.
PCT Notification of Transmittal of the International Search Report and the Written Opinion of the International Searching Authority, or the Declaration, for PT Application No. PCT/EP2005/011011, dated Apr. 24, 2006, 12 pages.
Sasaki, et al., "A Wide Dynamic Range CMOS Image Sensor with Multiple Short-Time Exposures," IEEE Proceedings on Sensors, 2004, Oct. 24-27, 2004 pp. 967-972 vol. 2.
Lane et al., "Automatic multidimensional deconvolution" J. Opt. Soc. Am. A, vol. 4(1), pp. 180-188, Jan. 1987.
Bates et al., "Some Implications of Zero Sheets for Blind Deconvolution and Phase Retrieval", J. Optical Soc. Am. A, vol. 7, pp. 468-479, 1990.
Seldin et al., "Iterative blind deconvolution algorithm applied to phase retrieval", J. Opt. Soc. Am. A, vol. 7(3), pp. 428-433, Mar. 1990.
Bones et al., "Deconvolution and Phase Retrieval With Use of Zero Sheets," J. Optical Soc. Am. A, vol. 12, pp. 1,842-1,857, 1995.
Jansson, Peter A, "Chapter 1: Convolution and Related Concepts," Deconvolution of Images and Spectra, 2nd. Edition, Academic Press, 1997.
Mitsuhito Mase, et al., "A Wide Dynamic Range CMOS Image Sensor with Multiple Exposure-Time Signal Outputs and 12-bit Column-Parallel Cyclic A/D Converters," IEEE Journal of Solid-State Circuits, vol. 40, No. 12, Dec. 2005.
Elad, et al., "Restoration of a Single Superresolution Image from several Blurred, Noisy and Undersampled Measured Images," IEEE Transactions on Image Processing, vol. 6, No. 12, Dec. 1997.

Moshe Ben-Ezra and Shree K. Nayar, "Motion Deblurring Using Hybrid Imaging", the Proceedings IEEE Computer Society Conference on Computer Vision and Pattern Recognition, 2003.
Paolo Favaro, "Depth from focus/defocus," document dated Jun. 25, 2002, http://homepages.inf.ed.ac.uk/rbf/CVonline/LOCAL_COPIES/FAVARO1/dfdtutorial.html.
PCT International Preliminary Report on Patentability, for PCT Application No. PCT/EP2005/011011, paper dated Jul. 24, 2006, 8 pages.
PCT Written Opinion of the International Searching Authority, for PCT Application No. PCT/EP2005/011011, paper dated Apr. 21, 2006, 6 pages.
PCT Notification of Transmittal of the International Search Report and the Written Opinion of the International Searching Authority, or the Declaration, PCT/EP2008/004729, dated Oct. 29, 2008, 9 pages.
Bhaskaran, V. et al., "Motion Estimation Using a Computation-Constrained Criterion," digital Signal Processing Proceedings, DSP '97, 13 Intl. Conf. On Santorini, IEEE, vol. 1, Jul. 2, 1997, pp. 229-232.
Deever, A., "In-Camera All-Digital Video Stabilization," Proc. of the Intl. Conf. on Decision Support Systems, Proc. of ISDSS, XX, XX, Jan. 1, 2006, pp. 190-193.
Demir, B. et al., Block Motion Estimation Using Adaptive Modified Two-Bit Transform, Jun. 5, 2007, vol. 1, No. 2, pp. 215-222.
Andrews, H.C. et al., "Digital Image Restoration", Prentice Hall, 1977.
Bennett, Eric P. et al., "Video Enhancement Using Per-Pixel Virtual Exposures", International Conference on Computer Graphics and Interactive Techniques, ACM Siggraph, 2005, pp. 845-852.
Cannon M., "Blind Deconvolution of Spatially Invariant Image Blurs with Phase, " IEEE Transactions on Acoustics, Speech, and Signal Processing, 1976, vol. ASSP-24, No. 1.
Co-pending U.S. Appl. No. 11/573,713.
Co-pending U.S. Appl. No. 12/063,089.
Co-pending U.S. Appl. No. 12/330,719.
Crowley, J. et al., "Multi-modal tracking of faces for video communication, http://citeseer.ist.psu.edu/crowley97multimodal.html", In Computer Vision and Patent Recognition, 1997.
Deller J. et al., "Discrete-Time Processing of Speech Signals," 1999, 2nd. Edition, Wiley-IEEE Press.
Deller, John R. Jr et al., "Discrete-Time Processing of Speech Signals", 1993, 908 pages, IEEE Press Classic Reissue (Hardcover).
Deng G. et al., "The study of logarithmic image processing model and its application to image enhancement," IEEE Trans. on Image Processing, 1999, pp. 506-512, vol. 4.
Elad, Michael et al., "Superresolution Restoration of an Image Sequence: Adaptive Filtering Approach", IEEE Transactions on Image Processing, 1999, pp. 529-541, vol. 8-Issue 3.
Feng, J. et al., "Adaptive block matching motion estimation algorithm using bit plane matching", ICIP, 1995, pp. 496-499.
Final Office Action mld Nov. 5, 2008, for U.S. Appl. No. 10/986,562, filed Nov. 10, 2004.
Final Office Action mailed Nov. 13, 2008, for U.S. Appl. No. 11/566,180, filed Dec. 1, 2006.
Final Office Action mailed Nov. 24, 2008, for U.S. Appl. No. 10/985,650, filed Nov. 10, 2004.
Fujita K. et al., An edge-adaptive iterative method for image restoration, Singapore ICCS/ISITA '92. "Communications on the Move" Singapore Nov. 16-20, 1992, New York, NY, USA, IEEE, US, Nov. 16, 1992,pp. 361-365, XP010066997, ISBN: 0-7803-0803-4.
Golub G. H. et al., "Matrix Computations," 1996, 3rd ed. John Hopkins Univ Press, Balt.
Gunturk et al., "High-Resolution Image Reconstruction from Multiple Differently Exposed Images," IEEE Signal Processing Letters, 2006, vol. 13, No. 4.
Hayes M., "Statistical Digital Signal Processing and Modeling," 1996, Wiley.
Haykin S., "Adaptive filter theory," 1996, Prentice Hall.
Jannson, Peter A., "Deconvolution of Images and Spectra," 1997, 2nd. Ed, Academic Press.
Jourlin M. et al., "Logarithmic image processing the mathematical and physical framework for the representation and processing of transmitted images," Advances in Imaging and Electron Physics, 2001, pp. 129-196, vol. 115.

Ko, S. et al., "Fast digital image stabilizer based on gray-coded bit-plane matching", IEEE Transactions on Consumer Electronics, 1999, pp. 598-603, vol. 45-Issue 3.

Kuglin C. D. et al., "The phase correlation iamge alignment method," Proc. Int. Conf. Cybernetics and Society, 1975, pp. 163-165, IEEE, Bucharest, Romania.

Lagendijk, R. L. et al., "Iterative Identification and Restoration of Images," 1991, Kluwer Academic.

Lhuillier, M. et al., "A quasi-dense approach to surface reconstruction from uncalibrated images, http://rlinks2.dialog.com/NASApp/ChannelWEB/DialogProServlet?ChName=engineering", IEEE Transactions on Pattern Analysis and Machine Intelligence, 2005, pp. 418-433, vol. 27-Issue 3, IEEE Comput. Soc.

Natarajan B. et al., "Low-complexity block-based motion estimation via one-bit transforms", IEEE Trans. Circuit Syst. Video Technol, 1997, pp. 702-706, vol. 7-Issue 5.

Office Action mailed Apr. 3, 2008, for U.S. Appl. No. 10/985,650, filed Nov. 10, 2004.

Office Action mailed Apr. 4, 2008, for U.S. Appl. No. 10/986,562, filed Nov. 10, 2004.

Office Action mailed Apr. 21, 2009, for U.S. Appl. No. 10/985,650, filed Nov. 10, 2004.

Office Action mailed Apr. 22, 2009, for U.S. Appl. No. 10/986,562, filed Nov. 10, 2004.

Office Action mailed Jun. 10, 2009, for U.S. Appl. No. 11/566,180, filed Dec. 1, 2006.

Office Action mailed Mar. 21, 2008, for U.S. Appl. No. 11/566,180, filed Dec. 1, 2006.

Office Action mailed May 11, 2009, for U.S. Appl. No. 12/199,680, filed Aug. 27, 2008.

Office Action mailed May 29, 2009, for U.S. Appl. No. 12/199,710, filed Aug. 27, 2008.

Oppenheim, A.V. et al., "The Importance of Phase in Signals, XP008060042, ISSN: 0018-9219.", Proceedings of the IEEE, 1981, pp. 529-541, vol. 69-Issue 5.

Park, Sung Cheol et al., "Super-resolution image reconstruction: a technical overview, ISSN: 1053-5888. DOI: 10.1109/MSP.2003.1203207.", Signal Processing Magazine, 2003, pp. 21-36, vol. 20-Issue 3, IEEE Publication.

Patti A. et al., "Super-Resolution video reconstruction with arbitrary sampling lattices and non-zero aperture time http://citeseer.ist.psu.edu/patti97super.html", In IEEE Transactions on Image Processing, 1997, pp. 1064-1078.

PCT International Preliminary Report on Patentability for PCT Application PCT/US2007/069638, dated Dec. 10, 2008, 5 pages.

PCT Notification of Transmittal of the International Search Report and the Written Opinion of the International Searching Authority, or the Declaration for PCT application No. PCT/US2007/069638, dated Mar. 5, 2008, 9 pages.

PCT Notification of Transmittal of the International Search Report and the Written Opinion of the International Searching Authority, or the Declaration for PCT Application No. PCT/EP2005/011011, dated Apr. 24, 2006, 12 pages.

PCT Notification of Transmittal of the International Search Report and the Written Opinion of the International Searching Authority, or the Declaration for PCT Application No. PCT/EP2007/009939, dated May 21, 2008, 13 pages.

PCT Written Opinion of the International Preliminary Examining Authority, PCT/EP2005/011011, dated Oct. 24, 2006, 4 pages.

Peng, She et al., "Motion View Reconstruction Method with Real Object Image based on Virtual Object Movement, http://rlinks2.dialog.com/NASApp/ChannelWEB/DialogProServlet?ChName=engineering", Eizo Joho Media Gakkai Gijutsu Hokoku, 2005, pp. 67-70, vol. 29-Issue 17.

Pickup, Lyndsey et al., "Optimizing and Learning for Super-resolution," BMVC, 9/4-7/06.

Pulli, Kari et al., "Robust Meshes from Multiple Range Maps, http://citeseer.ist.psu.edu/pulli97robust.html", In Proc. IEEE International Conference on Recent Advances in 3-D Digital Imaging and Modeling, 1997.

Sauer, K. et al., "Efficient Block Motion Estimation Using Integral Projections", IEEE Trans. Circuits, Systems for video Tech, 1996, pp. 513-518, vol. 6-Issue 5.

Schultz, Richard R. et al., "Extraction of High-Resolution Frames from Video Sequences, http://citeseer.ist.psu.edu/schultz96extraction.html", IEEE Transactions on image processing, 1996, pp. 996-1011.

Siu, Angus et al., "Image registration for image-based rendering, http://rlinks2.dialog.com/NASApp/ChannelWEB/DialogProServlet?ChName=engineering", IEEE Transactions on Image Processing, 2005, pp. 241-252, vol. 14-Issue 2.

Uomori, K. et al., "Automatic image stabilizing system by fulldigital signal processing" IEEE Transactions on Consumer Electronics, 1990, vol. 36, No. 3, pp. 510-519.

Wei, Jiang et al., "Dense Panoramic Imaging and 3D Reconstruction by Sensors Fusion, http://rlinks2.dialog.com/NASApp/ChannelWEB/DialogProServlet?ChName=engineering", Japan Sci. and Technol. Agency, JPN(JST); National Inst. Industrial Safety, JPN Nippon Kikai Gakkai Robotikusu, Mekatoronikusu Koenkai Koen Ronbunshu (CD-ROM), 2006, pp. 2P1-C15.

Yang, Chen-Kui et al., "Color image sharpening by moment-preserving technique", Signal Processing, 1995, pp. 397-403, vol. 45-Issue 3, Elsevier Science Publishers.

Yuan, Lu et al., "Image Deblurring with Blurred/Noisy Image Pairs," SIGGRAPH07, Aug. 5-9, 2007.

Zhang, Junping et al., "Change detection for the urban area based on multiple sensor information fusion, http://rlinks2.dialog.com/NASApp/ChannelWEB/DialogProServlet?ChName=engineering", IEEE International Geoscience and Remote Sensing Symposium, 2005, p. 4, IEEE.

Zitova, Barbara et al., "Image registration methods: a survey," Image and Vision Computing, 2003, pp. 977-1000, vol. 21.

* cited by examiner

METHOD OF DETERMINING PSF USING MULTIPLE INSTANCES OF A NOMINALLY SIMILAR SCENE

FIELD OF THE INVENTION

This invention relates to a digital image acquisition system comprising a digital processing component for determining a camera motion blur function in a captured digital image.

BACKGROUND TO THE INVENTION

Camera motion is dependent on a few parameters. First of all, the exposure speed. The longer the shutter is open, the more likely that movement will be noticed. The second is the focal length of the camera. The longer the lens is, the more noticeable the movement is. A rule of thumb for amateur photographers shooting 35 mm film is never to exceed the exposure time beyond the focal length, so that for a 30 mm lens, not to shoot slower than 1/30th of a second. The third criteria is the subject itself. Flat areas, or low frequency data, is less likely to be degraded as much as high frequency data.

Historically, the problem was addressed by anchoring the camera, such as with the use of a tripod or monopod, or stabilizing it such as with the use of gyroscopic stabilizers in the lens or camera body, or movement of the sensor plane to counteract the camera movement.

Mathematically, the motion blurring can be explained as applying a Point Spread Function, or PSF, to each point in the object. This PSF represent the path of the camera, during the exposure integration time. Motion PSF is a function of the motion path and the motion speed, which determines the integration time, or the accumulated energy for each point.

Figure 3A:
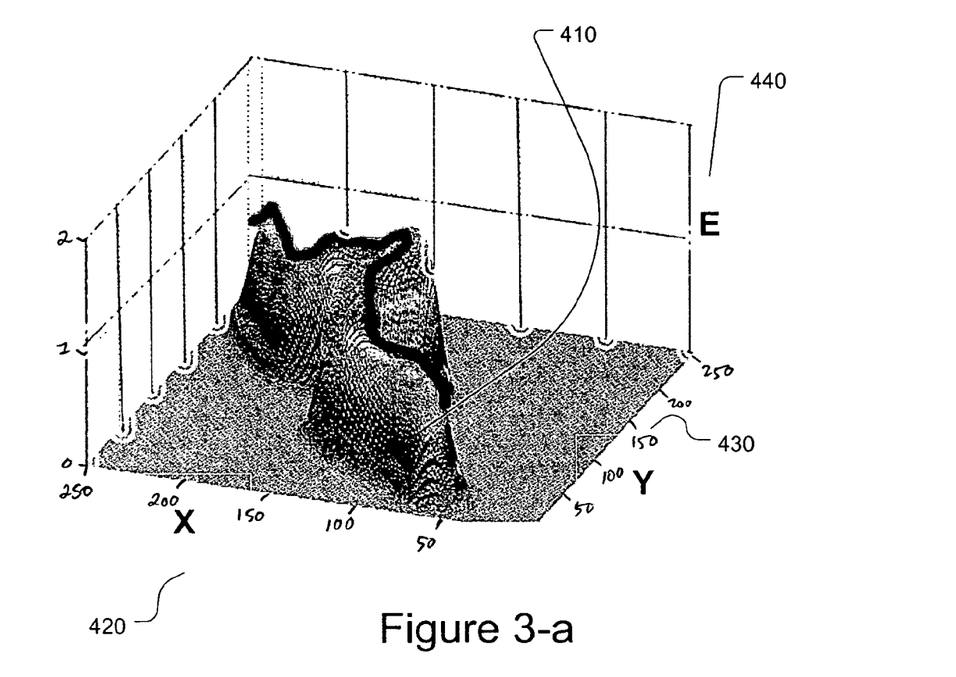
Figure 3B:
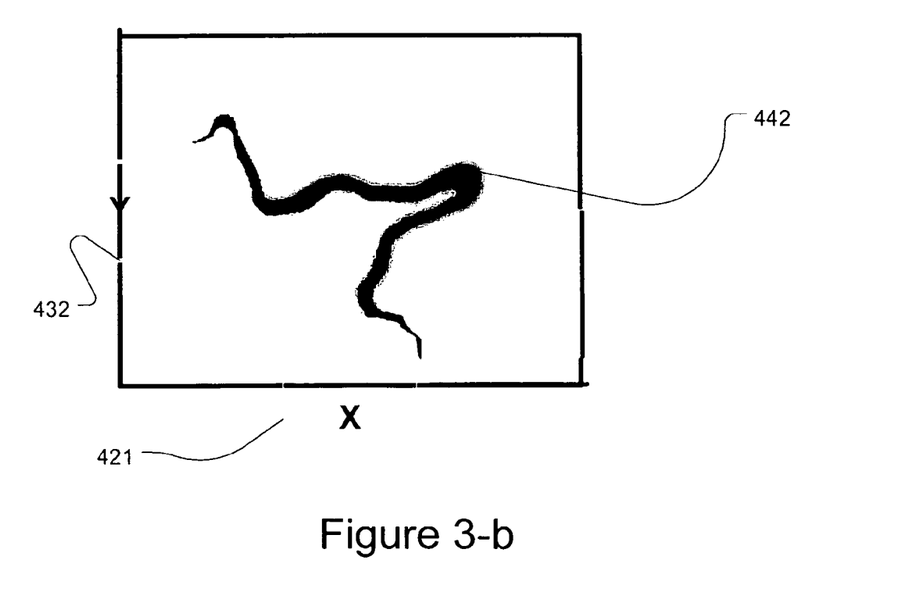

A hypothetical example of such a PSF is illustrated in FIGS. 3-$a$ and 3-$b$. FIG. 3-$b$ is a projection of FIG. 3-$a$. In FIGS. 3-$a$ and 3-$b$, the PSF is depicted by 410 and 442 respectively. The pixel displacement in x and y directions are depicted by blocks 420 and 421 respectively for the X axis and 430 and 432 for the Y axis respectively. The energy 440 is the third dimension of FIG. 3-$a$. Note that the energy is the inverse of the differential speed in each point, or directly proportional to the time in each point. In other words, the longer the camera is stationary at a given location, the longer the integration time is, and thus the higher the energy packed. This may also be depicted as the width of the curve 442 in a X-Y projection.

Figure 3C:
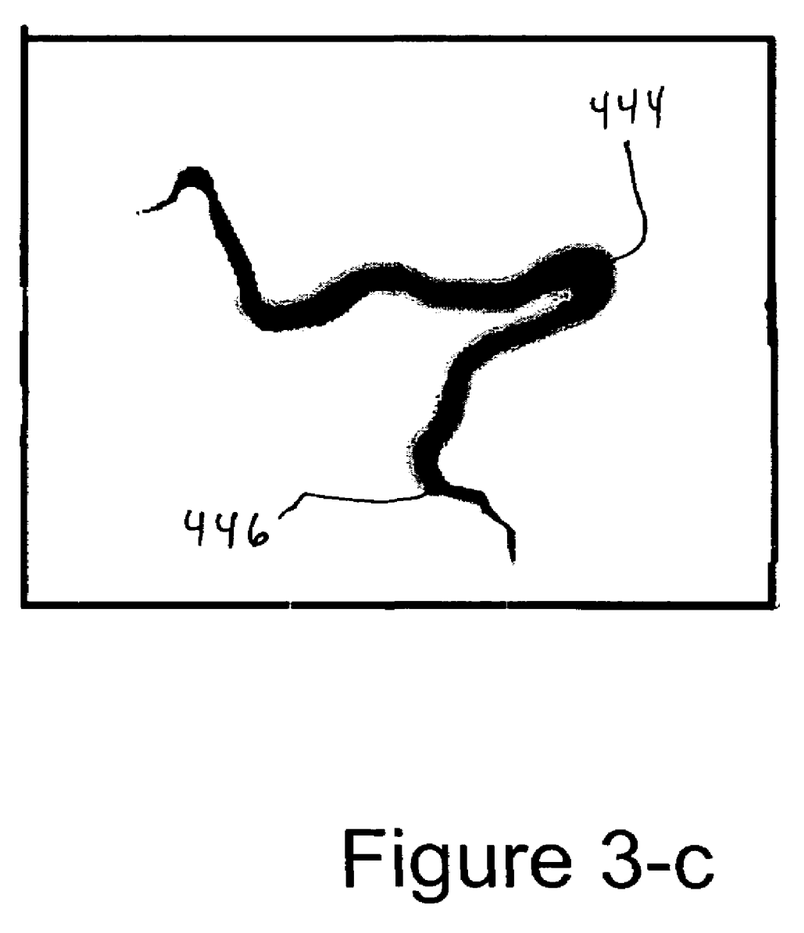

Visually, when referring to images, in a simplified manner, FIG. 3-$c$ illustrates what would happen to a pinpoint white point in an image blurred by the PSF of the aforementioned Figures. In a picture, such point of light surrounded by black background will result in an image similar to the one of FIG. 3-$c$. In such image, the regions that the camera was stationary longer, such as 444 will be brighter than the region where the camera was stationary only a fraction of that time. Thus such image may provide a visual speedometer, or visual accelerometer. Moreover, in a synthetic photographic environment such knowledge of a single point, also referred to as a delta-function could define the PSF.

Given:
  a two dimensional image I represented by I(x,y)
  a motion point spread function MPSF(I)
  The degraded image I'(x,y) can be mathematically defined as the convolution of I(X,Y) and MPSF(x,y) or $$I'(x,y)=I(x,y)MPSF(x,y) \quad \text{(Eq. 1)}$$

or in the integral form for a continuous function $$I(x,y)=\int\int(I(x-x',y-y')MPSF(x'y')\partial x'\partial y' \quad \text{(Eq. 2)}$$

and for a discrete function such as digitized images:

$$I'(m,n) = \sum_j \sum_k I(m-j, n-k)MPSF(j,k) \quad \text{(Eq. 3)}$$

Another well known PSF in photography and in optics in general is blurring created by de-focusing. The different is that de-focusing can usually be depicted by a symmetrical Gaussian shift invariant PSF, while motion de-blurring is not.

The reason why motion de-blurring is not shift invariant is that the image may not only shift but also rotate. Therefore, a complete description of the motion blurring is an Affine transform that combines shift and rotation based on the following transformation:

$$\begin{bmatrix} u \\ v \\ 1 \end{bmatrix} = \begin{bmatrix} \cos\omega & \sin\omega & \Delta x \\ -\sin\omega & \cos\omega & \Delta y \\ 0 & 0 & 1 \end{bmatrix} \quad \text{(Eq. 4)}$$

The PSF can be obtained empirically as part of a more generic field such as system identification. For linear systems, the PSF can be determined by obtaining the system's response to a known input and then solving the associated inversion problems.

The known input can be for an optical system, a point, also mathematically defined in the continuous world as a delta function δ(x), a line, an edge or a corner.

An example of a PSF can be found in many text books such as "Deconvolution of Images and Spectra" 2nd. Edition, Academic Press, 1997, edited by Jannson, Peter A. and "Digital Image Restoration", Prentice Hall, 1977 authored by Andrews, H. C. and Hunt, B. R.

The process of de-blurring an image is done using de-convolution which is the mathematical form of separating between the convolve image and the convolution kernel. However, as discussed in many publications such as Chapter 1 of "Deconvolution of Images and Spectra" 2nd. Edition, Academic Press, 1997, edited by Jannson, Peter A., the problem of de-convolution can be either unsolvable, ill-posed or ill-conditioned. Moreover, for a physical real life system, an attempt to find a solution may also be exacerbated in the presence of noise or sampling.

One may mathematically try and perform the restoration via de-convolution means without the knowledge of the kernel or in this case the PSF. Such methods known also as blind de-convolution. The results of such process with no a-priori knowledge of the PSF for a general optical system are far from acceptable and require extensive computation. Solutions based on blind de-convolution may be found for specific circumstances as described in "Automatic multidimensional deconvolution" *J. Opt. Soc. Am. A*, vol. 4(1), pp. 180-188, January 1987 to Lane et al, "Some Implications of Zero Sheets for Blind Deconvolution and Phase Retrieval", *J. Optical Soc. Am. A*, vol. 7, pp. 468-479, 1990 to Bates et al, Iterative blind deconvolution algorithm applied to phase retrieval", *J. Opt. Soc. Am. A*, vol. 7(3), pp. 428-433, March 1990. to Seldin et al and "Deconvolution and Phase Retrieval With Use of Zero Sheets," *J. Optical Soc. Am. A*, vol. 12, pp. 1,842-1,857, 1995 to Bones et al. However, as known to those familiar in the art of image restoration, and as explained in "Digital Image Restoration", Prentice Hall, 1977 authored by Andrews, H. C. and Hunt, B. R., blurred images can be substantially better restored when the blur function is known.

The article "Motion Deblurring Using Hybrid Imaging", by Moshe Ben-Ezra and Shree K. Nayar, from the *Proceedings IEEE Computer Society Conference on Computer Vision and Pattern Recognition,* 2003, determines the PSF of a blurred image by using a hybrid camera which takes a number of relatively sharp reference images during the exposure period of the main image. However, this requires a special construction of camera and also requires simultaneous capture of images. Thus this technique is not readily transferable to cheap, mass-market digital cameras.

It is an object of the invention to provide an improved technique for determining a camera motion blur function in a captured digital image which can take advantage of existing camera functionality and does not therefore require special measurement hardware (although the use of the invention in special or non-standard cameras is not ruled out).

SUMMARY OF THE INVENTION

According to the present invention there is provided a digital image acquisition system comprising an apparatus for capturing digital images and a digital processing component for determining a camera motion blur function in a captured digital image based on a comparison of at least two images each taken during, temporally proximate to or overlapping an exposure period of said captured image and of nominally the same scene.

Preferably, the at least two images comprise the captured image and another image taken outside, preferably before and alternatively after, the exposure period of said captured image.

Preferably at least one reference image is a preview image.

Preferably, too, said digital image acquisition system is a portable digital camera.

In one embodiment the digital processing component identifies at least one characteristic in a single reference image which is relatively less blurred than the corresponding feature in the captured image, and calculates a point spread function (PSF) in respect of said characteristic.

A characteristic as used in this invention may be a well-defined pattern. The better the pattern is differentiated from its surroundings, such as by local contrast gradient, local color gradient, well-defined edges, etc., the better such pattern can be used to calculate the PSF. In an extreme case, the pattern forming the characteristic can be only a single pixel in size.

In another embodiment the digital processing component calculates a trajectory of at least one characteristic in a plurality of reference images, extrapolates such characteristic on to the captured image, and calculates a PSF in respect of said characteristic.

In either case, based on the calculated PSF, the captured image can be deblurred using one of a number of de-convolution techniques known in the art.

Corresponding de-blurring function determining methods are also provided. One or more storage devices are also provided having digital code embedded thereon for programming one or more processors to perform the de-blurring function determining methods.

BRIEF DESCRIPTION OF THE DRAWINGS

Embodiments of the invention will now be described, by way of example, with reference to the accompanying drawings, in which:

FIGS. 3-*a* to 3-*c* illustrate an example of a point spread function (PSF).

FIGS. 6 and 7-*a* and 7-*b* are diagrams which assist in the understanding of the second embodiment.

DESCRIPTION OF A PREFERRED EMBODIMENT

Figure 1:
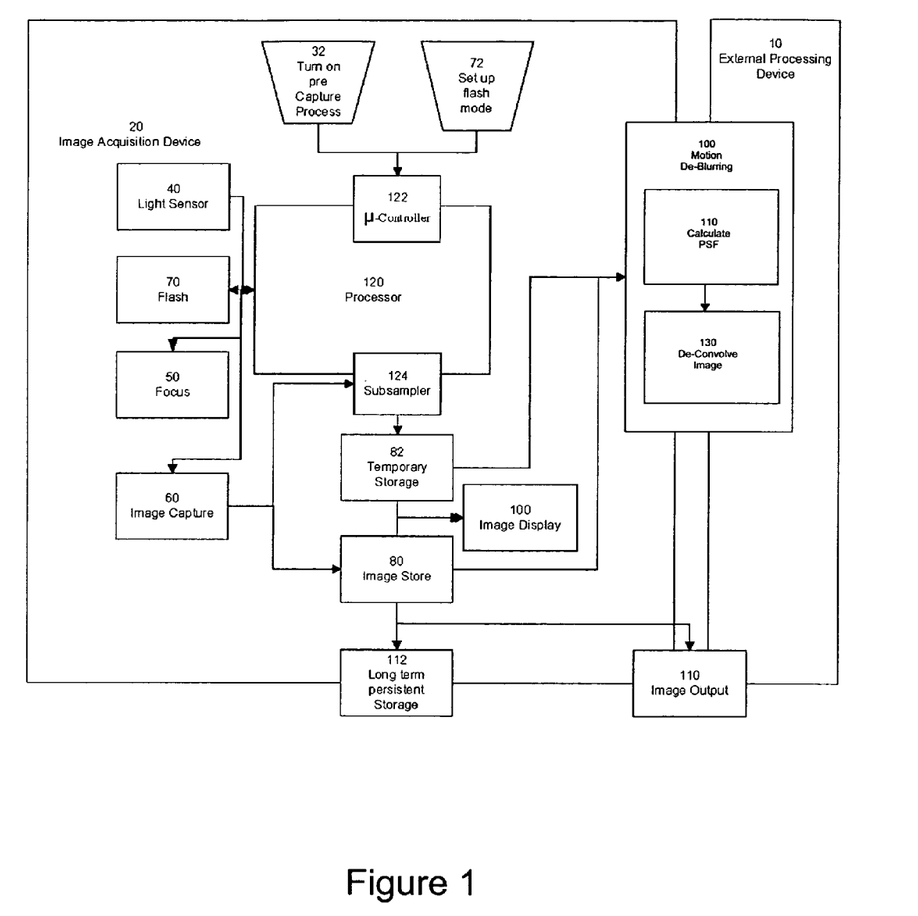
FIG. 1 is a block diagram of a camera apparatus operating in accordance with an embodiment of the present invention.

FIG. 1 shows a block diagram of an image acquisition system such as a digital camera apparatus operating in accordance with the present invention. The digital acquisition device, in this case a portable digital camera 20, includes a processor 120. It can be appreciated that many of the processes implemented in the digital camera may be implemented in or controlled by software operating in a microprocessor (μProc), central processing unit (CPU), controller, digital signal processor (DSP) and/or an application specific integrated circuit (ASIC), collectively depicted as block 120 and termed as "processor". Generically, all user interface and control of peripheral components such as buttons and display is controlled by a μ-controller 122.

The processor 120, in response to a user input at 122, such as half pressing a shutter button (pre-capture mode 32), initiates and controls the digital photographic process. Ambient light exposure is determined using light sensor 40 in order to automatically determine if a flash is to be used. The distance to the subject is determined using focusing means 50 which also focuses the image on image capture means 60. If a flash is to be used, processor 120 causes the flash means 70 to generate a photographic flash in substantial coincidence with the recording of the image by image capture means 60 upon full depression of the shutter button. The image capture means 60 digitally records the image in colour. The image capture means is known to those familiar with the art and may include a CCD (charge coupled device) or CMOS to facilitate digital recording. The flash may be selectively generated either in response to the light sensor 40 or a manual input 72 from the user of the camera.

The image recorded by image capture means 60 is stored in image store means 80 which may comprise computer memory such a dynamic random access memory or a non-volatile memory. The camera is equipped with a display 100, such as an LCD at the back of the camera or a microdisplay inside the viewfinder, for preview and post-view of images. In the case of preview images, which are generated in the pre-capture mode 32, the display 100 can assist the user in composing the image, as well as being used to determine focusing and exposure. A temporary storage space 82 is used to store one or plurality of the preview images and be part of the image store means 80 or a separate component. The preview image is usually generated by the same image capture means 60, and for speed and memory efficiency reasons may be generated by subsampling the image 124 using software which can be part of the general processor 120 or dedicated hardware, before displaying 100 or storing 82 the preview image.

Upon full depression of the shutter button, a full resolution image is acquired and stored, 80. The image may go through image processing stages such as conversion from the RAW sensor pattern to RGB, format, color correction and image enhancements. These operations may be performed as part of the main processor 120 or by using a secondary processor such as a dedicated DSP. Upon completion of the image processing the images are stored in a long term persistent storage such as a removable storage device 112.

According to this embodiment, the system includes a motion de-blurring component 100. This component can be implemented as firmware or software running on the main processor 120 or on a separate processor. Alternatively, this component may be implemented in software running on an external processing device 10, such as a desktop or a server, which receives the images from the camera storage 112 via the image output mechanism 110, which can be physical removable storage, wireless or tethered connection between the camera and the external device. The motion de-blurring component 100 includes a PSF calculator 110 and an image de-convolver 130 which de-convolves the full resolution image using the PSF. These two components may be combined or treated separately. The PSF calculator 110 may be used for qualification only, such as determining if motion blur exists, while the image de-convolver 130 may be activated only after the PSF calculator 110 has determined if de-blurring is needed.

Figure 2:
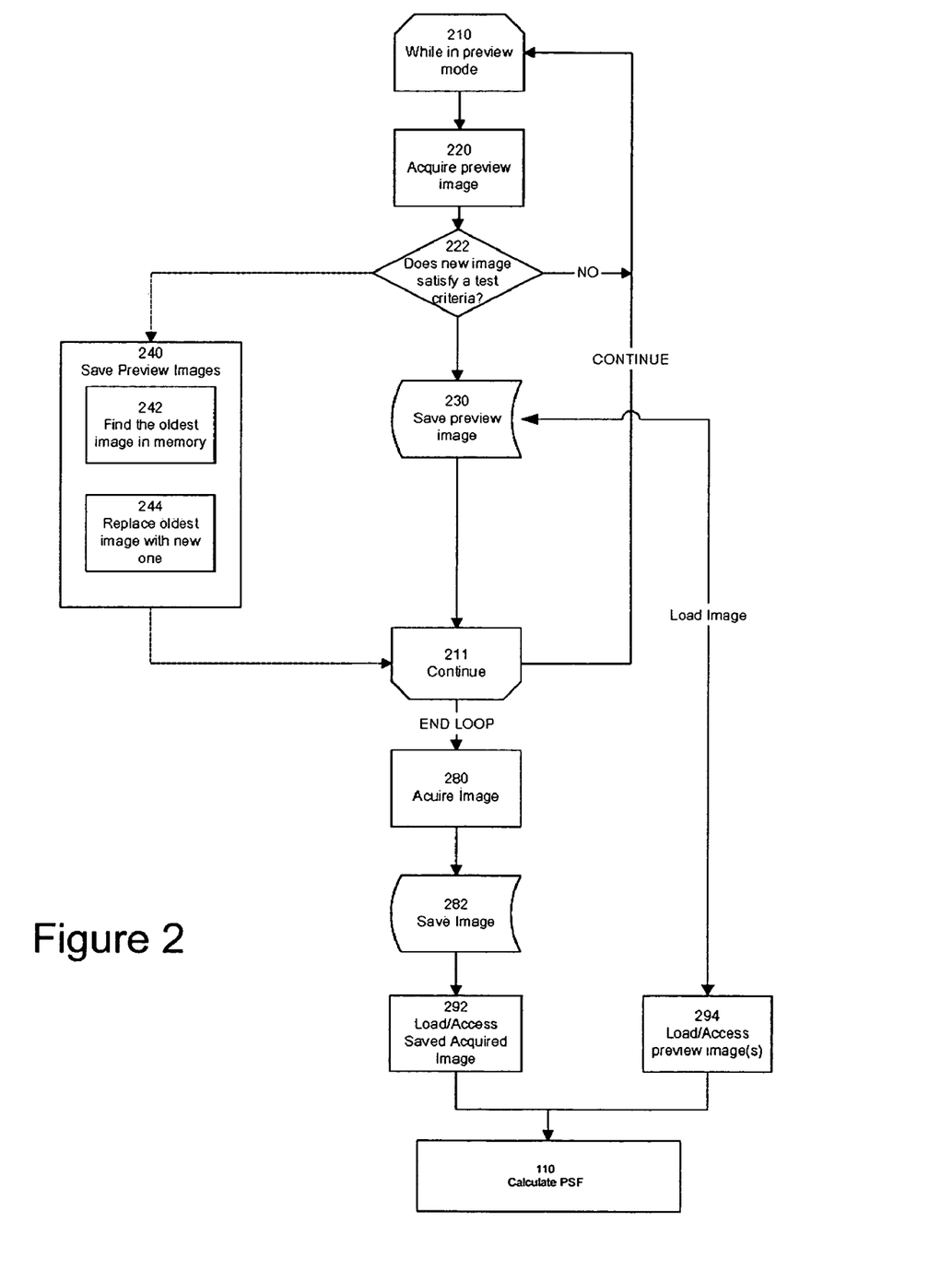
FIG. 2 illustrates the workflow of the initial stage of a camera motion blur reducing means using preview data according to embodiments of the invention.

FIG. 2 is a flow chart of one embodiment of calculating the PSF in accordance with the present invention. While the camera is in preview mode, 210, the camera continuously acquires preview images, calculating exposure and focus and displaying the composition. When such an image satisfies some predefined criteria 222, the preview image is saved, 230. As explained below, such criteria will be defined based on image quality and/or chronological considerations. A simple criteria may be always save the last image. More advanced image quality criteria may include analysis as to whether the preview image itself has too much motion blurring. As an alternative to saving a single image, multiple images may be saved, 240, the newest preview image being added to the list, replacing the oldest one, 242 and 244. The definition of oldest can be chronological, as in First In First Out. Alternatively it can be the image that least satisfies criteria as defined in stage 222. The process continues, 211, until the shutter is release is fully pressed, 280, or the camera is turned off.

The criteria, 222, that a preview image needs to satisfy can vary depending on specific implementations of the algorithm. In one preferred embodiment, such criteria may be whether the image is not blurred. This is based on the assumption that even if a camera is constantly moving, being hand held by the user, there are times where the movement is zero, whether because the user is firmly holding the camera or due to change of movement direction the movement speed is zero at a certain instance. Such criteria may not need to be absolute. In addition such criteria may be based on one or more 1-dimensional vectors as opposed to the full two dimensional image. In other words, the criteria 222 may be satisfied if the image is blurred horizontally, but no vertical movement is recorded and vice versa, due to the fact that the motion may be mathematically described in orthogonal vectors, thus separable. More straight forward criteria will be chronological, saving images every predefined time which can be equal or slower to the speed the preview images are generated. Other criteria may be defined such as related to the exposure, whether the preview reached focus, whether flash is being used, etc.

Finally, the full resolution image acquired at 280 is saved, 282.

After the full resolution image is saved, 282, it is loaded into memory 292 and the preview image or images are loaded into memory as well, 294. Together the preview and final images are the input of the process which calculates the PSF, 110.

Figure 4:
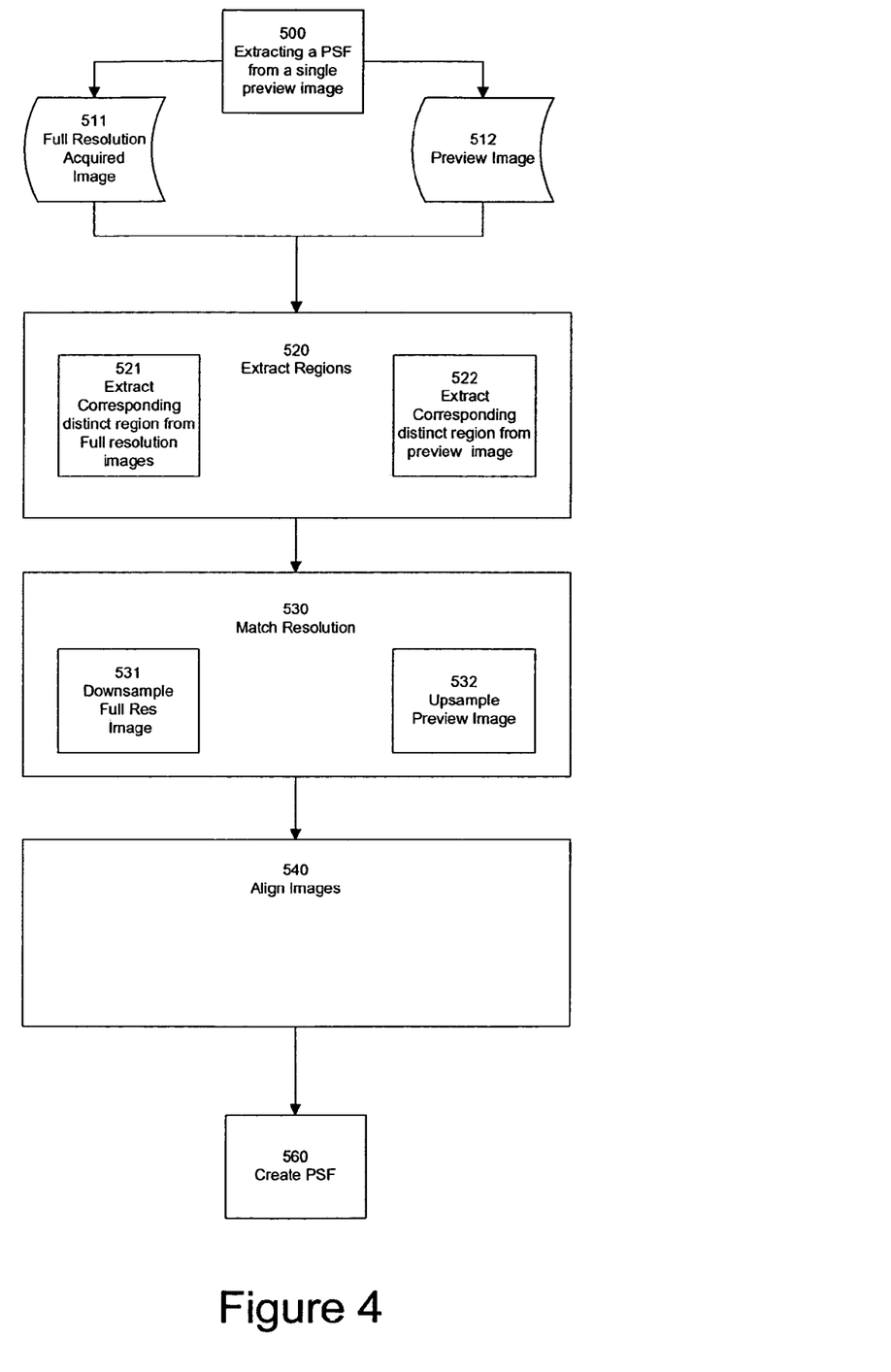
FIG. 4 is a workflow illustrating a first embodiment of the invention.
Figure 5:
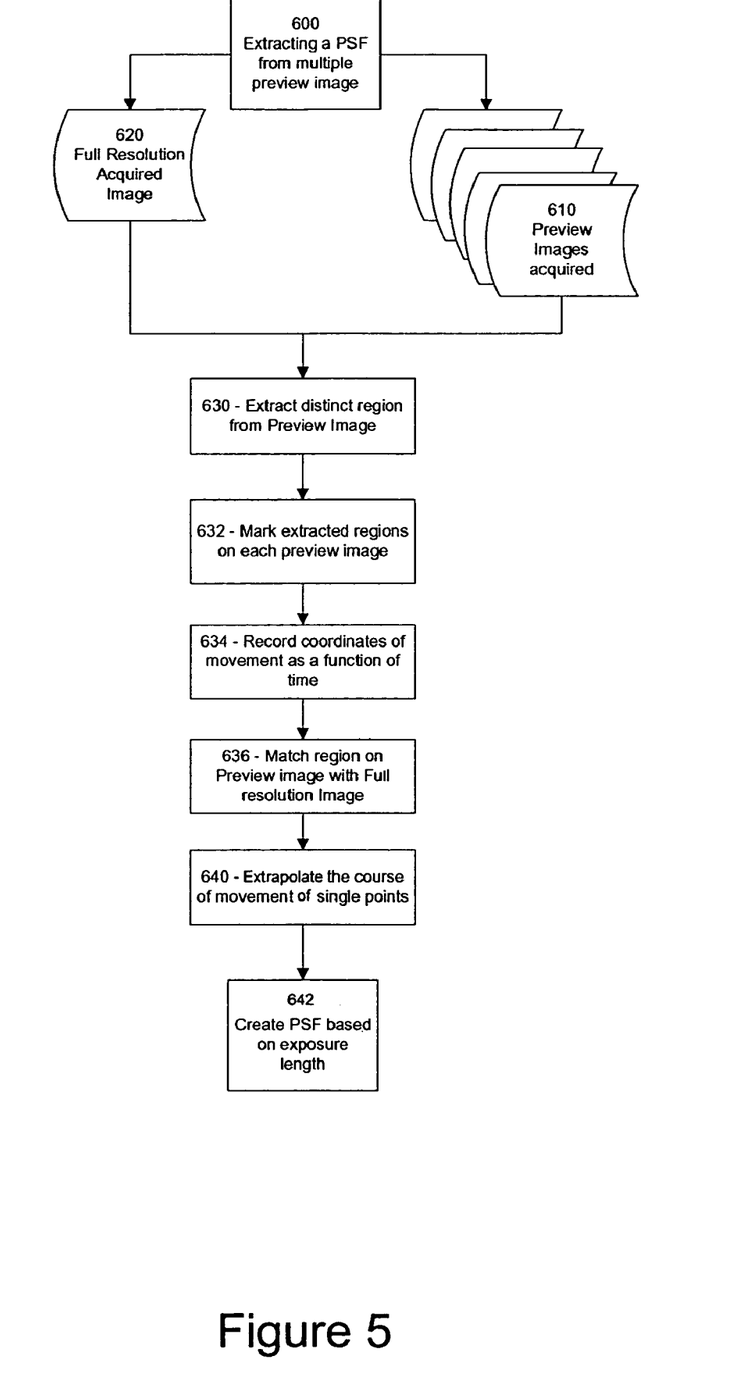
FIG. 5 is a workflow illustrating a second embodiment of the invention.

A description of two different methods of calculating the PSF are illustrated in FIGS. 4 and 5.

FIG. 4 shows an embodiment 500 for extracting a PSF using a single preview image.

In this embodiment, the input is the finally acquired full resolution image 511, and a saved preview image 512. Prior to creating the PSF, the preview and final image have to be aligned. The alignment can be a global operation, using the entire images, 511 and 512. However, the two images may not be exact for several reasons.

Due to the fact that the preview image and the final full resolution image differ temporally, there may not be a perfect alignment. In this case, local alignment, based on image features and using techniques known to those skilled in the art, will normally be sufficient. The process of alignment may be performed on selected extracted regions 520, or as a local operation. Moreover, this alignment is only required in the neighborhood of the selected region(s) or feature(s) used for the creation of the PSF. In this case, matching regions of the full resolution and preview image are extracted, 521 and 522. The process of extraction of such regions may be as simple as separating the image into a grid, which can be the entire image, or fine resolution regions. Other more advanced schemes will include the detection of distinct regions of interest based on a classification process, such as detecting regions with high contrast in color or exposure, sharp edges or other distinctive classifiers that will assist in isolating the PSF. One familiar in the art is aware of many algorithms for analyzing and determining local features or regions of high contrast; frequency transform and edge detection techniques are two specific examples that may be employed for this step, which may further include segmentation, feature extraction and classification steps.

The preview image 512 is normally, but not necessarily, of lower resolution than the full resolution image 511, typically being generated by clocking out a subset of the sensor cells or by averaging the raw sensor data. Therefore, the two images, or alternatively the selected regions in the images, need to be matched in pixel resolution, 530. In the present context "pixel resolution" means the size of the image, or relevant region, in terms of the number of pixels constituting the image or region concerned. Such a process may be done by either upsampling the preview image, 532, downsampling the acquired image, 531, or a combination thereof. Those familiar in the art will be aware of several techniques best used for such sampling methods.

Now we recall from before that:

A two dimensional image I is given as I(x,y).

A motion point spread function describing the blurring of image I is given as MPSF(I).

The degraded image I'(x,y) can be mathematically defined as the convolution of I(X,Y) and MPSF(x,y) or $$I'(x,y) = I(x,y) MPSF(x,y) \qquad (\text{Eq. 1})$$

Now it is well known that where a mathematical function, such as the aforementioned MPSF(x,y), is convoluted with a Dirac delta function δ(x,y) that the original function is preserved. Thus, if within a preview image a sharp point against a homogenous background can be determined, it is equivalent to a local occurrence of a 2D Dirac delta function within the unblurred preview image. If this can now be matched and aligned locally with the main, blurred image I'(x,y) then the distortion pattern around this sharp point will be a very close approximation to the exact PSF which caused the blurring of the original image I(x,y). Thus, upon performing the alignment and resolution matching between preview and main images the distortion patterns surrounding distinct points or high contrast image features, are, in effect, representations of the 2D PSF, for points and representation of a single dimension of the PSF for sharp, unidirectional lines.

The PSF may be created by combining multiple regions. In the simple case, a distinguished singular point on the preview image and its corresponding motion blurred form of this point which is found in the main full-resolution image is the PSF.

However, as it may not always be possible to determine, match and align, a single distinct point in both preview and full resolution image, it is alternatively possible to create a PSF from a combination of the orthogonal parts of more complex features such as edges and lines. Extrapolation to multiple 1-D edges and corners should be clear for one familiar in the art. In this case multiple line-spread-functions, depicting the blur of orthogonal lines need to be combined and analysed mathematically in order to determine a single-point PSF.

Due to statistical variances this process may not be exact enough to distinguish the PSF based on a single region. Therefore, depending on the processing power and required accuracy of the PSF, the step of finding the PSF may include some statistical pattern matching or statistical combination of results from multiple regions within an image to create higher pixel and potentially sub pixel accuracy for the PSF.

As explained above, the PSF may not be shift invariant. Therefore, the process of determining the right PSF may be performed in various regions of the image, to determine the variability of the PSF as a function of location within the image.

FIG. 5 shows a method 600 of extrapolating a PSF using multiple preview images.

In this embodiment, the movement of the image is extrapolated based on the movement of the preview images. According to FIG. 5, the input for this stage is multiple captured preview images 610, and the full resolution image 620. All images are recorded with an exact time stamp associated with them to ensure the correct tracking. In most cases, preview images will be equally separated, in a manner of several images per second. However, this is not a requirement for this embodiment as long as the interval between images, including the final full resolution image, is known.

One or more distinctive regions in a preview image are selected, 630. By distinctive, one refers to a region that can be isolated from the background, such as regions with noticeable difference in contrast or brightness. Techniques for identifying such regions are well known in the art and may include segmentation, feature extraction and classification.

Each region is next matched with the corresponding region in each preview image, 632. In some cases not all regions may be accurately determined on all preview images, due to motion blurring or object obscurations, or the fact that they have moved outside the field of the preview image. The coordinates of each region is recorded, 634, for the preview images and, 636, for the final image.

Knowing the time intervals of the preview images, one can extrapolate the movement of the camera as a function of time. When the full resolution image 620 is acquired, the parameter that needs to be recorded is the time interval between the last captured preview image and the full resolution image, as well as the duration of the exposure of the full resolution image. Based on the tracking before the image was captured, 634, and the interval before and duration of the final image, the movement of single points or high contrast image features can be extrapolated, 640, to determine the detailed motion path of the camera.

Figure 6:
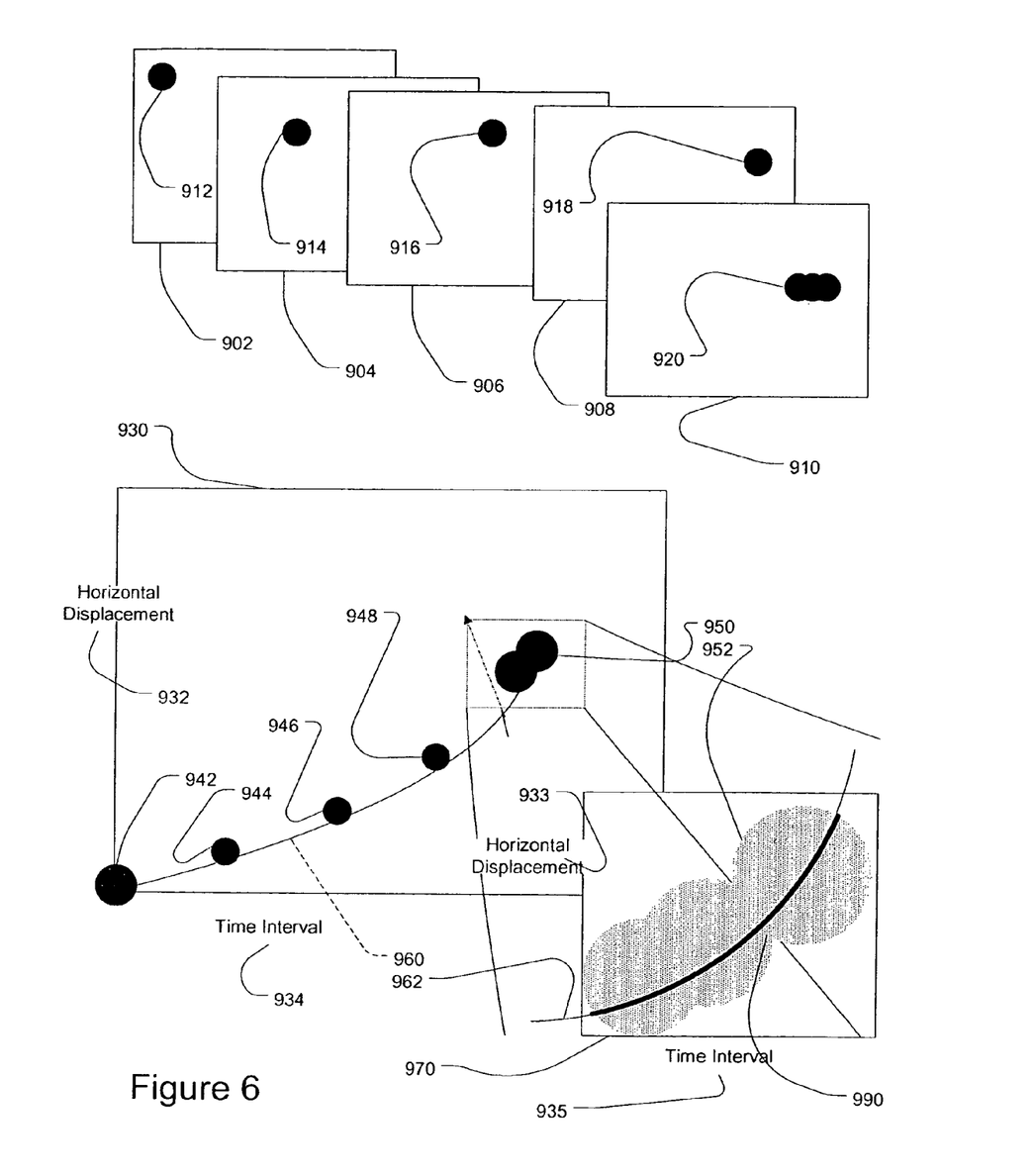

This process is illustrated in FIG. 6. According to this figure multiple preview images 902, 904, 906, 908 are captured. In each of them a specific region 912, 914, 916, 918 is isolated which corresponds to the same feature in each image. The full resolution image is 910, and in it the region corresponding to 912, 914, 916, 918 is marked as 920. Note that 920 may be distorted due to motion blurring.

Tracking one dimension as a function of time, the same regions are illustrated in 930 where the regions are plotted based on their displacement 932, as a function of time interval 932. The objects 942, 944, 946 948 and 950 correspond to the regions 912, 914, 916, 918 and 920.

The motion is calculated as the line 960. This can be done using statistical interpolation, spline or other curve interpolation based on discrete sampling points. For the final image, due to the fact that the curve may not be possible to calculate, it may also be done via extrapolation of the original curve, 960.

The region of the final acquired image is enlarged 970 for better viewing. In this plot, the blurred object 950 is depicted as 952, and the portion of the curve 690 is shown as 962. The time interval in this case, 935 is limited to the exact length in which the exposure is being taken, and the horizontal displacement 933, is the exact horizontal blur. Based on that, the interpolated curve, 952, within the exposure time interval 935, produces an extrapolation of the motion path 990.

Now an extrapolation of the motion path may often be sufficient to yield a useful estimate of the PSF if the motion during the timeframe of the principle acquired image can be shown to have practically constant velocity and practically zero acceleration. As many cameras now incorporate sensitive gyroscopic sensors it may be feasible to determine such information and verify that a simple motion path analysis is adequate to estimate the motion blur PSF.

Figure 7A:
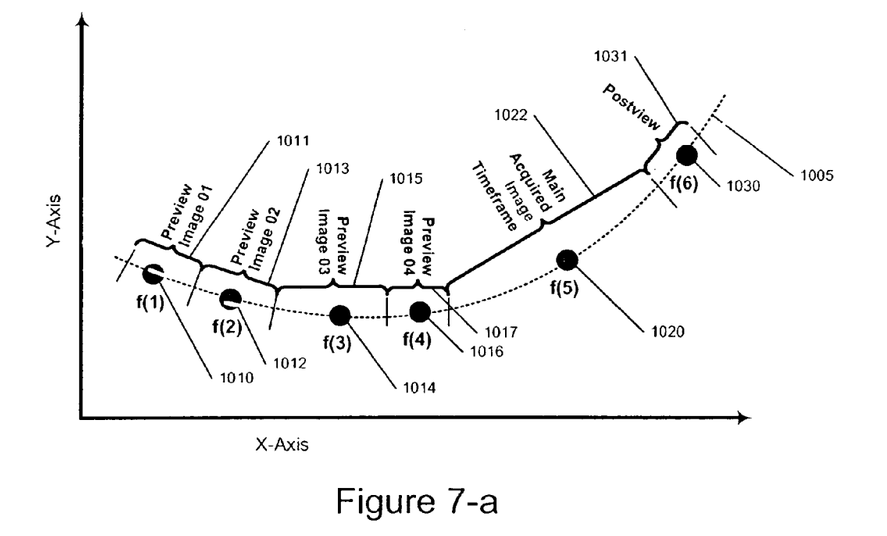
Figure 7B:
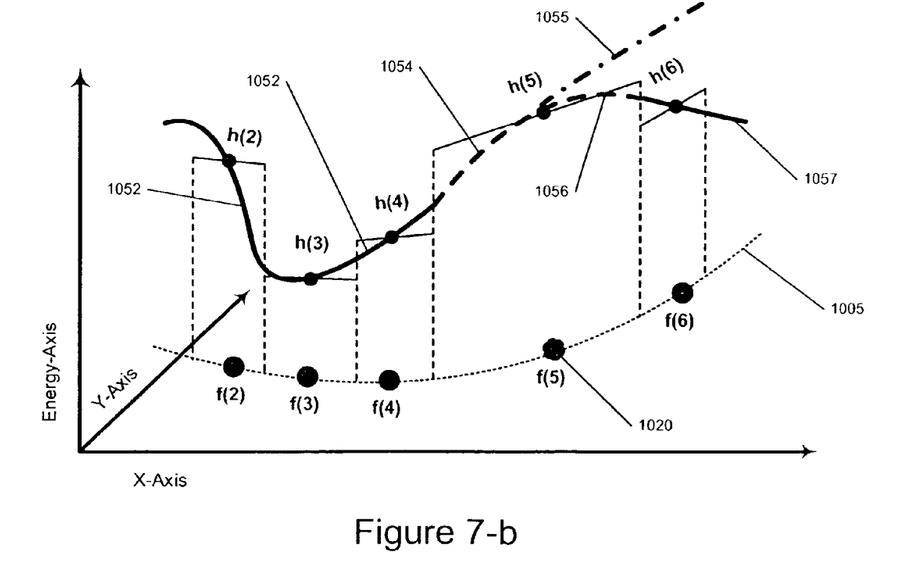

However when this is not the case (or where it is not possible to reliably make such a determination) it is still possible to estimate the detailed motion blur PSF from a knowledge of the time separation and duration of preview images and a knowledge of the motion path of the camera lens across an image scene. This process is illustrated in FIGS. 7-a and 7-b and will now be described in more detail.

Any PSF is an energy distribution function which can be represented by a convolution kernel k(x,y)-->w where (x,y) is a location and w is the energy level at that location. The kernel k must satisfy the following energy conservation constraint:

$$\int\int k(x,y) dx\, dy = 1,$$

which states that energy is neither lost nor gained by the blurring operation. In order to define additional constraints that apply to motion blur PSFs we use a time parameterization of the PSF as a path function, f(t)-->(x,y) and an energy function h(t)-->w. Note that due to physical speed and acceleration constraints, f(t) should be continuous and at least twice differentiable, where f'(t) is the velocity of the (preview) image frame and f"(t) is the acceleration at time t. By making the assumption that the scene radiance does not change during image acquisition, we get the additional constraint:

$$\int_{t}^{t+\delta t} h(t)\, dt = \frac{\delta t}{t_{end} - t_{start}}, \delta t > 0, t_{start} \le t \le t_{end} - \delta t,$$

where [$t_{start}$, $t_{end}$] is the acquisition interval for a (preview) image. This constraint states that the amount of energy which is integrated at any time interval is proportional to the length of the interval.

Given these constraints we can estimate a continuous motion blur PSF from discrete motion samples as illustrated in FIGS. 7-*a* and 7-*b*. First we estimate the motion path, f(t), by spline interpolation as previously described above and as illustrated in FIG. 6. This path [1005] is further illustrated in FIG. 7-*a*.

Now in order to estimate the energy function h(t) along this path we need to determine the extent of each image frame along this interpolated path. This may be achieved using the motion centroid assumption described in Ben-Ezra et al and splitting the path into frames with a 1-D Voronoi tessellation as shown in FIG. 7-*a*. Since the assumption of constant radiance implies that frames with equal exposure times will integrate equal amounts of energy, we can compute h(t) for each frame as shown in FIG. 7-*b*. Note that as each preview frame will typically have the same exposure time thus each rectangle in FIG. 7-*b*, apart from the main image acquisition rectangle will have equal areas. The area of the main image rectangle, associated with capture frame 5 [1020] in this example, will typically be several time larger than preview image frames and may be significantly more than an order of magnitude larger if the exposure time of the main image is long.

The resulting PSF determined by this process is illustrated in FIG. 7-*b* and may be divided into several distinct parts. Firstly there is the PSF which is interpolated between the preview image frames [1052] and shown as a solid line; secondly there is the PSF interpolated between the last preview image and the midpoint of the main acquired image [1054]; thirdly there is the extrapolation of the PSF beyond the midpoint of the main acquired image [1055] which, for a main image with a long exposure time—and thus more susceptible to blurring—is more likely to deviate from the true PSF. Thus it may be desirable to acquire additional postview images, which are essentially images acquired through the same in-camera mechanism as preview images except that they are acquired after the main image has been acquired. This technique will allow a further interpolation of the main image PSF [1056] with the PSF determined from at least one postview image.

The process may not be exact enough to distinguish the PSF based on a single region. Therefore, depending on the processing power and accuracy need, the step of finding the PSF may include some statistical pattern matching of multiple regions, determining multiple motion paths, thus creating higher pixel and potentially sub pixel accuracy for the PSF.

Advantageously, a determination may be made whether a threshold amount of camera motion blur has occurred during the capture of a digital image. The determination is made based on a comparison of a least two images acquired during or proximate to the exposure period of the captured image. The processing occurs so rapidly, either in the camera or in an external processing device, that the image blur determination occurs in "real time". The photographer may be informed and/or a new image capture can take place on the spot due to this real time image blur determination feature. Preferably, the determination is made based on a calculated camera motion blur function, and further preferably, the image may be de-blurred based on the motion blur function, either in-camera or in an external processing device in real time or later on.

While an exemplary drawings and specific embodiments of the present invention have been described and illustrated, it is to be understood that that the scope of the present invention is not to be limited to the particular embodiments discussed. Thus, the embodiments shall be regarded as illustrative rather than restrictive, and it should be understood that variations may be made in those embodiments by workers skilled in the arts without departing from the scope of the present invention as set forth in the appended claims and structural and functional equivalents thereof.

In addition, in methods that may be performed according to preferred embodiments herein and that may have been described above, the operations have been described in selected typographical sequences. However, the sequences have been selected and so ordered for typographical convenience and are not intended to imply any particular order for performing the operations, except for those where a particular order may be expressly set forth or where those of ordinary skill in the art may deem a particular order to be necessary.

In addition, all references cited herein as well as the background, invention summary, abstract and brief description of the drawings are incorporated by reference into the description of the preferred embodiment as disclosing alternative embodiments.

What is claimed is:

1. A digital image acquisition system comprising an apparatus for capturing digital images and a digital processing component for determining a camera motion blur function in a captured digital image based on a comparison of at least two sets of image data, including at least one relatively low resolution reference image, each acquired with a same sensor, such that at least a same portion of said same sensor captures at least a portion of each of said at least two sets of image data, within a temporal range that includes an exposure period of the captured digital image, and times proximately before and after said exposure period, and of nominally the same scene as that of the captured digital image, and wherein said at least two sets of image data comprise said at least one relatively low resolution reference image, or at least one processed version of said at least one reference image taken outside the exposure period of said captured digital image and modified pursuant to processing including aligning or matching pixel resolution of said at least two sets of image data, or both, and wherein said digital processing component is arranged to compare the at least two sets of image data for determining said camera motion blur function in said captured digital image, and to determine to de-blur said captured digital image only when the camera motion blur function indicates that sufficient blur exists within the captured digital image.

2. A system according to claim 1 wherein the camera motion blur function is mathematically defined as a point spread function (PSF).

3. A system according to claim 1, wherein said digital processing component further de-blurs the captured image using said determined camera motion blur function.

4. A system according to claim 1, wherein at least one of the sets of image data that are compared comprises a preview image.

5. A system according to claim 1, wherein said digital processing component is arranged to match the pixel resolutions of the at least two sets of image data.

6. A system according to claim 5, wherein said digital processing component is arranged to match the pixel resolutions of the first and second image data sets by at least one of up-sampling the first image data set and sub-sampling the second image data set.

7. A system according to claim 1, wherein the alignment is a global alignment on entire or substantially entire images.

8. A system according to claim 1, wherein said digital processing component uses the captured image and a single reference image as the image data sets that are compared.

9. A system according to claim 8, wherein said digital processing component identifies at least one characteristic of the reference image which is relatively less blurred than the corresponding characteristic of the captured image, and calculates said blur function in respect of said characteristic.

10. A system according to claim 9, wherein said digital processing component de-blurs the captured image by de-convolving the captured image using the blur function.

11. A system according to claim 1, wherein said digital processing component uses the captured image and multiple reference images taken at successive points in time.

12. A system according to claim 11, wherein said digital processing component calculates a trajectory of at least one characteristic in the reference images, extrapolates such characteristic on to the captured image, and calculates said blur function in respect of said characteristic.

13. A system according to claim 12, wherein said digital processing component de-blurs the captured image by de-convolving the captured image using the blur function.

14. A system according to claim 1, wherein said digital processing component is configured to inform the photographer if it determines that the captured image is blurred.

15. A system of according to claim 14, wherein the digital image capturing apparatus is configured to capture another image if the digital processing component determines that the captured image is blurred.

16. A system of according to claim 1, wherein the digital image capturing apparatus is configured to capture another image if the digital processing component determines that the captured image is blurred.

17. A system according to claim 1, wherein said digital image acquisition system comprises a portable digital camera comprising a single sensor for capturing said at least two sets of image data.

18. A system as claimed in claim 17, wherein said digital processing component is located in said portable digital camera.

19. A system according to claim 1, wherein said digital image acquisition system comprises a combination of a portable digital camera and an external processing device, wherein said camera comprises a single sensor for capturing said at least two sets of image data.

20. A system as claimed in claim 19, wherein said digital processing component is located in said external processing device.

21. A system as in claim 1, wherein said digital image capturing apparatus is configured to capture a reference image before said exposure period of said captured image.

22. A system according to claim 1 wherein the camera motion blur function is mathematically defined as a point spread function (PSF).

23. A system according to claim 1, wherein said digital processing component is configured to further de-blur the captured image using said determined camera motion blur function.

24. A system according to claim 1, wherein the reference image comprises a preview image.

25. A system according to claim 1, wherein the reference image comprises a lower pixel resolution than the captured image, and wherein said digital processing component is arranged to match the pixel resolutions of the captured image and the reference image.

26. A system according to claim 25, wherein said digital processing component is arranged to match the pixel resolutions of the captured image and the reference mage by at least one of up-sampling the reference image and sub-sampling the captured image.

27. A system according to claim 1, wherein said motion blur function determining occurs in real-time relative to the image capture.

28. A system according to claim 1, wherein said apparatus comprises an image sensor component and said at least two sets of image data are acquired by said same image sensor component.

29. A system according to claim 28, wherein said apparatus further comprises an optical system and said at least two sets of image data are acquired along said same optical path.

30. In a digital image acquisition system including an apparatus for capturing digital images, including a lens, an image sensor and a processor, a method comprising programming said processor with program code embedded within a computer readable medium, and using said processor in determining a camera motion blur function in a captured digital image based on a comparison of at least two images each acquired with a same sensor, including at least one relatively low resolution reference image, such that at least a same portion of said same sensor captures at least a portion of each of said at least two sets of image data, within a temporal range that includes an exposure period of the captured digital image, and times proximately before and after said exposure period, and of nominally the same scene as that of the captured digital image, and wherein said at least two sets of image data comprise said at least one relatively low resolution reference image, or at least one processed version of said at least one reference image taken outside the exposure period of said captured digital image and modified pursuant to processing including aligning or matching pixel resolution of said at least two sets of image data, or both, and wherein said digital processing component is arranged to compare the at least two sets of image data for determining said camera motion blur function in said captured digital image, and to determine to de-blur said captured digital image only when the camera motion blur function indicates that sufficient blur exists within the captured digital image.

31. A method according to claim 30, wherein said reference image is taken before said exposure period of said captured image.

32. A method according to claim 30, wherein the determining comprises matching pixel resolutions of the reference and captured images by at least one of up-sampling a reference image and sub-sampling the captured image.

33. A method according to claim 30, further comprising identifying at least one characteristic of the reference image which is relatively less blurred than the corresponding characteristic of the captured image, and calculating said blur function in respect of said characteristic.

34. A method according to claim 30, further comprising calculating a trajectory of at least one characteristic in the reference image, extrapolating such characteristic onto the captured image, and calculating said blur function in respect of said characteristic.

35. A method according to claim 30, wherein the camera motion blur function comprises a point spread function (PSF).

36. A method according to claim 30, further including de-blurring the captured image using said determined camera motion blur function.

37. A method according to claim 36, wherein the de-blurring comprises de-convolving the captured image using the blur function.

38. A method according to claim 30, further including informing the photographer when the captured image is determined to be blurred.

39. A method according to claim 30, further including transferring the at least two images from the digital image capturing apparatus to an external processing device for determining the motion blur function.

40. A method according to claim 30, wherein the motion blur function determining is performed in real time relative to the capturing of the digital image.

41. method according to claim 30, further comprising acquiring images corresponding to said at least two image data sets with a same image sensor component.

42. A method according to claim 41, wherein said capturing of said images occurs along a same optical path.

43. One or more processor-readable storage devices having digital code embedded therein for programming one or more processors to perform a camera motion blur function determining method that comprises capturing digital images, and determining a camera motion blur function in a captured digital image based on a comparison of at least two images each acquired with a same sensor, such that at least a same portion of said same sensor captures at least a portion of each of said at least two sets of image data, within a temporal range that includes an exposure period of the captured digital image, and times proximately before and after said exposure period, and of nominally the same scene as that of the captured digital image, and wherein said at least two sets of image data comprise at least one relatively low resolution reference image, or at least one processed version of said at least one reference image taken outside the exposure period of said captured digital image and modified pursuant to processing including aligning or matching pixel resolution of said at least two sets of image data, or both, and wherein said digital processing component is arranged to compare the at least two sets of image data for determining said camera motion blur function in said captured digital image, and to determine to de-blur said captured digital image only when the camera motion blur function indicates that sufficient blur exists within the captured digital image.

44. The one or more storage devices of claim 43, wherein said reference image is taken before said exposure period of said captured image.

45. The one or more storages devices of claim 43, wherein the determining comprises matching pixel resolutions of the reference and captured images by at least one of up-sampling a reference image and sub-sampling the captured image.

46. The one or more storage devices of claim 43, the method further comprising identifying at least one characteristic of the reference image which is relatively less blurred than the corresponding characteristic of the captured image, and calculating said blur function in respect of said characteristic.

47. The one or more storage devices of claim 43, the method further comprising calculating a trajectory of at least one characteristic in the reference image, extrapolating such characteristic onto the captured image, and calculating said blur function in respect of said characteristic.

48. The one or more storage devices of claim 43, wherein the camera motion blur function comprises a point spread function (PSF).

49. The one or more storage devices of claim 43, further including de-blurring the captured image using said determined camera motion blur function.

50. The one or more storage devices of claim 49, wherein the de-blurring comprises de-convolving the captured image using the blur function.

51. The one or more storage devices of claim 43, the method further including informing the photographer when the captured image is determined to be blurred.

52. The one or more storage devices of claim 43, the method further including transferring the at least two images from the digital image capturing apparatus to an external processing device for determining the motion blur function.

53. The one or more storage devices of claim 43, wherein the motion blur function determining is performed in real time relative to the capturing of the digital image.

54. The one or more storage devices of claim 43, the method further comprising acquiring images corresponding to said at least two image data sets with a same image sensor component.

55. The one or more storage devices of claim 54, wherein said capturing of said images occurs along a same optical path.

* * * * *

UNITED STATES PATENT AND TRADEMARK OFFICE
CERTIFICATE OF CORRECTION

PATENT NO. : 7,636,486 B2
APPLICATION NO. : 10/985657
DATED : December 22, 2009
INVENTOR(S) : Steinberg et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1055 days.

Signed and Sealed this

Ninth Day of November, 2010

David J. Kappos
*Director of the United States Patent and Trademark Office*